2,946,021
Patented July 19, 1960

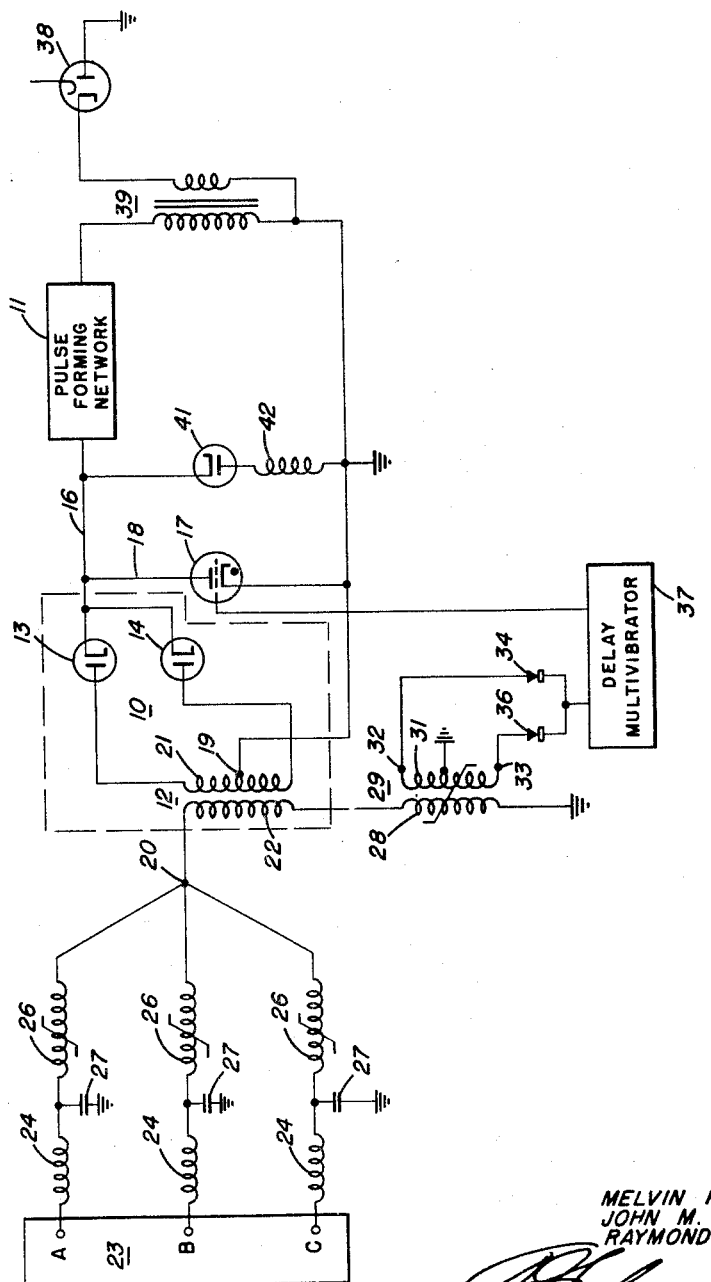

2,946,021
PULSING CIRCUIT FOR MAGNETRON

Melvin P. Siedband, Baltimore, John M. Hirst, Glen Burnie, and Raymond Casey, Baltimore, Md., assignors, by mesne assignments, to the United States of America as represented by the Secretary of the Navy Filed Feb. 10, 1958, Ser. No. 742,700

1 Claim. (Cl. 331—87)

The present invention relates to radar modulators and more particularly to improved radar modulators for generating short pulses in which the conventional power supply and direct current resonant charging circuits have been replaced by a system of saturable reactors.

The system herein described sextuples the basic line frequency of 400 cycles per second and applies energy at a pulse repetition rate of 2400 cycles per second to the pulse forming network. The pulse forming network is discharged by a thyratron when triggered by a synchronized signal. The synchronizing of the signal is determined by a saturable reactor and a delay multivibrator.

An object of the present invention is the provision of a novel circuit which will provide equal distribution of load on three phase line, increased efficiency, lower operating voltages and synchronization directly from the line.

Another object is to provide a radar modulator for the generation of short pulses in which the conventional power supply and direct current resonant charging circuits are replaced by a system of saturable reactors.

A further object of the invention is the provision of a radar modulator wherein the synchronization of the signal for discharging the pulse forming network is determined by a circuit consisting of a saturable reactor and a delay multivibrator.

Other objects and many of the attendant advantages of this invention will be readily appreciated as the same becomes better understood by reference to the following detailed description when considered in connection with the accompanying drawing wherein the single figure shows the preferred embodiment of the invention.

Referring now to the drawing, there is shown a charging circuit 10 for charging the pulse forming network 11 which may be of any suitable type; e.g., such as any of those shown on pages 6–11, in Fig. 6B of Principles of Radar, Radar School, Massachusetts Institute of Technology, 1946, McGraw-Hill Book Co., New York. Charging circuit 10 has a transformer 12 and diodes 13 and 14. The plates of diodes 13 and 14 are connected to the terminals of the secondary winding 21 of transformer 12 to effect full wave rectification of the impressed voltage. The cathodes of diodes 13, 14 are connected to the pulse forming network 11 and the plate of thyratron 17 through conductors 16 and 18, respectively. A unidirectional positive output voltage appears on the plate of thyratron 17 and to the input of pulse forming network 11 when an alternating potential is impressed across primary winding 22 of transformer 12. The cathode of thyratron 17 is connected to the center tap 19 of secondary winding 21 of transformer 12.

One end of primary winding 22 of transformer 12 is connected to a three phase power supply 23 at junction 20. Each of phases A, B and C of the power supply 23 have connected in series therewith inductance 24 and saturable reactor 26. Connected intermediate inductance 24 and saturable reactor 26 and ground is a capacitor 27.

The other end of winding 22 is connected in series with primary winding 28 of saturable transformer 29 to ground. The terminals 32, 33 of secondary winding 31 are connected to rectifiers 34 and 36 respectively to effect full wave rectification. The mid-point of secondary winding 21 is grounded. The output of rectifiers 34, 36 is connected to the input of a delay multivibrator 37, the output of which is coupled to the control grid of thyratron 17.

Magnetron 38 is coupled to the pulse forming network 11 through transformer 39. A by-pass diode 41 and an inductance 42 are connected in series across the thyratron 17 to prevent the thyratron voltage from building up to a value greater than its maximum allowable value.

In operation (phase A) inductance 24 and capacitor 27 are resonant at the line frequency. Saturable reactor 26 goes into saturation when the voltage at capacitor 27 is at its maximum. The energy of capacitor 27, or charging pulse, is then transferred through saturable reactor 26, transformer 12 and diode 13 to the pulse forming network 11. In each cycle capacitor 27 will charge and be discharged twice, at the positive and at the negative maxima. The diodes 13 and 14 permit the pulse forming network to charge only in the positive direction and prevent discharge back through the transformer 12. The leading edge of the charging pulse causes a pulse to appear on the secondary winding 31 of saturable transformer 29 which trips the delay multivibrator 37. Saturable transformer 29 operates in the conventional manner to provide a peaked or spiked voltage in the secondary winding 31 when a charging pulse flows in the primary winding 28. Rectifiers 34 and 36 are provided so that a pulse will be applied to multivibrator 37 on the negative half of the cycle. The multivibrator 37 has enough delay to permit the pulse forming network 11 to charge fully and then it triggers the thyratron 17 to discharge the pulse forming network and generate the radar zero time pulse for the magnetron 38. Phases B and C perform the same way as phase A. Since only one saturable reactor is saturated at a time, no interaction takes place between them. The system will also operate satisfactorily as a single phase system if operated at an 800 cycles per second rate.

The functions of diode 41 and coil 42 may be assumed by diodes 13 and 14 in combination with transformer 12. By proper design of transformer 12, diode 41 and coil 42 may be eliminated, for if reverse polarity charges were to exist on the pulse forming network 11, diodes 13 and 14 would carry this charge to ground via the leakage reactance of transformer 12.

The invention as herein described has the advantage of equal distribution of the load on each phase of the 400 cycles per second three phase line. It also provides excellent power factor characteristics and increased efficiency. The circuit further provides low operating voltages prior to the pulse forming network. It is also to be noted that the described system provides frequency multiplication and synchronization directly from the line.

Obviously many modifications and variations of the present invention are possible in the light of the above teachings. It is therefore to be understood that within the scope of the appended claim the invention may be practiced otherwise than as specifically described.

What is claimed is:

In a radar modulator, the combination including a source of alternating voltage, a first circuit including an inductance and capacitor series connected across said voltage source, a second circuit including a saturable reactor, a primary winding of a first transformer, and a primary winding of a saturable transformer connected in series between the junction of said inductance and capacitor and one side of said voltage source, said first transformer having a secondary winding, said saturable transformer having a secondary winding, first and second diodes, the plate of said first diode connected to one end of said first transformer secondary winding, the plate of said second diode being connected to the other end of said first transformer secondary winding, the cathodes of said diodes being connected to a common junction, an auto-transformer having a primary winding and an output terminal, a pulse forming network connected in series with the primary winding of said auto-transformer between said common junction and the mid-point of said first transformer secondary winding, whereby said pulse forming network will be charged when a positive voltage is applied to said diodes, a magnetron tube connected between said output terminal of said auto-transformer and said other side of said voltage source, a thyratron tube connected across said series connected pulse forming network and auto-transformer primary winding for discharging said pulse forming network, a delay multivibrator having input and output means, means coupling the grid of said thyratron to the output means of said delay multivibrator, and rectifier means connected to said saturable transformer secondary winding and to the input means of said delay multivibrator whereby a signal will be applied to trigger said thyratron when said pulse forming network is fully charged.

References Cited in the file of this patent

UNITED STATES PATENTS

| | | |
|---|---|---|
| 2,405,069 | Tonks | July 30, 1946 |
| 2,542,066 | Varela | Feb. 20, 1951 |
| 2,596,142 | Gerwin | May 13, 1952 |
| 2,659,008 | Floyd | Nov. 10, 1953 |
| 2,743,360 | Stanton | Apr. 24, 1956 |
| 2,814,738 | Freeman | Nov. 26, 1957 |
| 2,837,645 | Siedband | June 3, 1958 |